United States Patent [19]
Bärenwäld

[11] Patent Number: 5,749,315
[45] Date of Patent: May 12, 1998

[54] ANIMAL FEEDER

[75] Inventor: Jörg R. Bärenwäld, Bainbridge, Ohio

[73] Assignee: ACO Polymer Products, Inc., Chardon, Ohio

[21] Appl. No.: 658,171

[22] Filed: Jun. 4, 1996

[51] Int. Cl.$^6$ .................................................. A01K 5/01
[52] U.S. Cl. ................................. 119/52.1; 119/61
[58] Field of Search ........................ 119/52.1, 521, 119/515, 61, 54

[56] References Cited

U.S. PATENT DOCUMENTS

| | | |
|---|---|---|
| 1,066,710 | 7/1913 | Clarke . |
| 1,137,460 | 4/1915 | Carlson . |
| 1,346,026 | 7/1920 | Hiner et al. .................... 119/54 |
| 1,446,740 | 2/1923 | Eummelin ................... 119/464 |
| 1,638,270 | 8/1927 | Nilsson ....................... 119/52.1 |
| 1,680,181 | 8/1928 | Smith ......................... 119/52.1 |
| 1,701,338 | 2/1929 | Rowles ........................ 119/54 |
| 1,772,383 | 8/1930 | Bernard ....................... 119/54 |
| 1,815,512 | 7/1931 | Kopetka . |
| 2,507,264 | 5/1950 | Otto ............................ 119/61 |
| 2,531,915 | 11/1950 | Maly .......................... 119/464 |
| 2,773,473 | 12/1956 | Martin ........................ 119/464 |
| 2,933,063 | 4/1960 | Geerlings . |
| 2,959,154 | 11/1960 | Adams . |
| 3,205,860 | 9/1965 | Moore ......................... 119/61 |
| 3,698,594 | 10/1972 | Boehlert ..................... 119/61 |
| 3,730,141 | 5/1973 | Manning et al. ............ 119/52.1 |
| 3,911,869 | 10/1975 | Lien . |
| 4,029,051 | 6/1977 | McKinney .................. 119/61 |
| 4,147,132 | 4/1979 | Gilst . |
| 4,312,298 | 1/1982 | Swearingin ................. 119/54 |
| 4,355,598 | 10/1982 | Saylor ....................... 119/52.1 |
| 4,825,588 | 5/1989 | Norman ...................... 119/61 |
| 4,949,676 | 8/1990 | Burns . |
| 5,010,849 | 4/1991 | Kleinsasser . |
| 5,176,104 | 1/1993 | Baxter . |
| 5,195,458 | 3/1993 | Black et al. . |

FOREIGN PATENT DOCUMENTS

| | | |
|---|---|---|
| 2623370 | 11/1987 | France . |
| 1514284 | 11/1987 | U.S.S.R. . |
| 8303739 | 11/1983 | WIPO . |

OTHER PUBLICATIONS

Nasco Farm & Ranch catalog, pp. 55, (1996).
Tri–County Product catalog, pp. 19–21.
Farmweld products catalog, pp. 6–13 (1994).
King Systems product Literature.
Kane's Nursery Feeders product literature.
Modern Ag Systems product literature.
Aco Farm® III product data sheets (1994).
Circle B Mfg., Inc, Economy Stainless Steel Feeders E–Series product literature.
Aco Farm® III, Ad–Lib Feeder Technical Handbook (1990).
R.D. Equipment, Inc. brochure, pp. 12–13 (Jan. 1995).

*Primary Examiner*—Paul J. Hirsch
*Attorney, Agent, or Firm*—Watts Hoffmann Fisher & Heinke

[57] ABSTRACT

An animal feeder including a hopper portion and a trough portion. The hopper portion is removable from the trough portion to facilitate cleaning. By providing a plurality of trough portions having differing numbers of feed holes in one or both sides, the hopper can be removed from one trough and used in another trough to accommodate differing numbers of feeding animals.

22 Claims, 8 Drawing Sheets

ANIMAL FEEDER

BACKGROUND OF THE INVENTION

The present invention relates to animal feeders and, more particularly, to pig feeders. Pig feeders come in various designs, but typically include a trough portion where the animals access the feed, and a hopper portion which holds the feed and gradually dispenses it to the trough portion for consumption by the animals.

The requirements of feeding various populations of growing animals in modern livestock facilities are diverse. One issue that must be addressed is the fact that as the animals grow, their size can increase dramatically. A single feeder is frequently inadequate to address the needs of a given population of animals throughout their growth cycle. As a result, the feeders must either be replaced or modified to accommodate the changing animals. Similarly, to accommodate changing populations, animals are frequently moved from pen to pen within a facility according to size and pen capacity. The changing of feeders between animal populations, the movement of animals within a facility, and the accumulation of animal waste makes the maintenance of sanitary conditions extremely important. Accordingly, to combat the transmission of disease and illness among animals, it is necessary to clean the feeders frequently.

Existing feeder designs are typically made of sheet metal or other material that must be welded or fastened together. The resultant constructs can be difficult and time consuming to clean. The assembly of such designs also creates various joints and seems that can harbor bacteria and germs. Due to the numerous joints and seems, even a thorough cleaning may not be adequate to provide the desired level of sanitation.

Another aspect of feeding pigs is that they tend to damage the feeders. To increase their useful life many feeders are made of steel or other sheet metal and, as a result, carry with them the above-noted health risks associated with such structures. Moreover, when a feeder is damaged, current designs require the removal and replacement of the entire feeder in order to avoid injury to the animals. Failure to maintain an adequate number of spare feeders on hand can result in the disruption of feeding schedules, and potentially necessitate the premature movement of animals and crowding of pens. This can be time consuming and costly, as well as adverse to the health and well being of the animals.

The present invention provides a feeder design that advantageously addresses the forgoing concerns.

DISCLOSURE OF THE INVENTION

The present invention provides a feeder design that can be easily and thoroughly cleaned, and provides a farmer with a great deal of flexibility in addressing situations where one or more feeders become damaged. The present invention provides a two piece hopper-trough assembly in which a single hopper can be used with several different troughs. The advantageous design of the inventive apparatus can yield significant economic and health benefits. For example, when a given trough or hopper is damaged, one need only replace the damaged portion. In today's large scale facilities, this can result in significant economic savings, since the trough portion can be replaced less expensively than the entire feeder. Moreover, because troughs and hoppers can be mixed and matched, the farmer has greater flexibility in dealing with situations where one or more feeders become damaged, without interrupting feeding schedules or necessitating the movement or redistribution of animals within the facility. This can provide even further economic savings and reduce the health risks associated with the movement of animals and overcrowding of pens. Still further, the wide variety of trough combinations associated with the invention gives the farmer flexibility in accommodating and locating widely varying animal populations within a given facility. Importantly, due to its unique two piece design, both the trough and the hopper can be easily and thoroughly cleaned, resulting in a significant health benefit.

A principal advantage of the present invention is its two piece hopper-trough construction, wherein the hopper can be removed from a given trough and used with other troughs having differing numbers of feed holes. As a result, when a trough is damaged, it can be replaced less expensively than the entire feeder. Moreover, in the event of a damaged hopper, a substitute can be used from another part of the facility without having to remove the feed trough or otherwise upset the feeding schedule. Still further, when it is necessary to change from, for example, a five pig feeder to a four pig feeder, but one or more feeder parts have been damaged, the farmer can mix and match parts from the facility until a suitable replacement part can be obtained. A significant advantage of the invention is its contribution to the overall sanitation of the facility, and hence the health and hygiene of the animals. Because the hopper can be removed from the trough, all regions of the feeder can be easily accessed for thorough cleaning. Moreover, due to the preferred roto-molded construction of the inventive feeder, there are no seems, fasteners or welds associated with either the trough portion or the hopper portion. As a result, these prime harbors for bacteria and germ growth are eliminated.

Other advantages associated with the invention stem from the particulars of its design. For example, the preferred trough design includes individual feed holes which can be easily manufactured to be separated an optimum distance apart to reduce or eliminate crowding and shoulder contact between feeding animals. This will reduce aggression between animals during feeding. Similarly, the trough can be easily manufactured to include divider walls between feed holes within the trough. In this way, eye contact between adjacent feeding animals is eliminated, which also reduces aggression.

In accordance with the foregoing, the invention provides an animal feeder comprising a hopper portion and a trough portion. The hopper portion includes hopper wall structure having first and second ends and defining a hopper cavity having a first end perimeter and a second end perimeter that is smaller than said first end perimeter. The trough portion includes trough wall structure defining a trough cavity. The hopper portion releasably cooperates with the trough portion to suspend the second end perimeter within the trough cavity. The trough wall structure includes at least one void therein, whereby feed disposed within the hopper cavity flows into the trough cavity and is accessible through said at least one void. In one aspect of the invention the trough wall structure includes a first end adapted to cooperate with the hopper wall structure by releasably engaging at least a portion of the hopper wall structure to suspend the second end perimeter within said trough cavity. Preferably, the trough wall first end defines a trough first end perimeter that is complimentary to the hopper first end perimeter and cooperates with the hopper first end perimeter to support the hopper cavity within the trough cavity.

In another aspect of the invention the trough wall structure includes hopper support members disposed within the trough cavity and adapted to cooperate with said hopper wall structure. The hopper support members releasably engage at least a portion of the hopper wall structure to suspend the second end perimeter within the trough cavity, either by themselves or in conjunction with other trough structure such as the trough wall first, or upper, ends or first end perimeter. Preferably, the hopper support members also function as divider walls to reduce or eliminate eye contact between feeding animals. Thus, in one embodiment, the feeder includes a plurality of voids disposed in the trough wall structure, and the trough wall structure includes divider members disposed between adjacent voids. The divider members are generally planar and extend into the trough cavity generally transversely of the trough wall structure. As noted, the divider members can be configured to cooperate with the hopper wall structure by releasably engaging at least a portion of the hopper wall structure to suspend the second end perimeter within said trough cavity and function as hopper support members.

As will be apparent, the ability of the hopper to be releasably engaged with and removed from the trough in the feeder of the invention enables the provision of an animal feeder system in which a plurality of troughs can be employed with a single hopper. Accordingly, it is another aspect of the invention to provide an animal feeder system comprising first and second trough portions including trough wall structure defining a trough cavity, and including at least one void disposed in the wall structure of each of said first and second trough portions. The system further comprises a hopper portion including hopper wall structure having first and second ends and defining a hopper cavity having a first end perimeter and a second end perimeter that is smaller than said first end perimeter. The hopper portion is adapted to cooperate with each of the said first and second trough portions to suspend the second end perimeter within either of said trough cavities, whereby feed disposed within said hopper cavity flows into one of the trough cavities and is accessible from the voids in the trough wall structure.

In the preferred embodiment, the number of voids disposed in the wall structure of the second trough portion is greater than the number of voids disposed in the wall structure of the first trough portion. Moreover, in the preferred construction, the voids are generally annular apertures, or feed holes, through the trough wall structure. In one aspect of the invention the wall structure of the first trough portion includes at least one aperture or feed hole therethrough, and the wall structure of the second trough portion includes at least two apertures or feed holes therethrough, and the number of apertures in the wall structure of the second trough portion is greater than the number of apertures in the wall structure of the first trough portion.

In a preferred aspect of the feeder system of the invention, each of the trough portions includes generally planar divider walls disposed along the wall structure between adjacent voids or apertures that extend generally transversely of the trough wall structure into the trough cavity. As noted, the preferred divider walls can be configured to function as support members for the hopper.

In still another preferred aspect of the invention the hopper wall structure comprises a pair of opposed side walls and a pair of opposed end walls transverse said side walls, said hopper side walls and end walls intersecting to define said hopper cavity, said trough wall structure comprises a pair of opposed side walls and a pair of opposed end walls transverse said side walls and intersecting to define said trough cavity, and the voids comprise generally annular apertures disposed in at least one of said trough side walls. In accordance with this preferred embodiment, the animal feeder system comprises first and second trough portions including a pair of generally opposed side walls and a pair of generally opposed end walls transverse said side walls, said trough side walls and end walls intersecting to define the trough cavity, at least one side wall of each of the trough portions including at least one void disposed therein. Likewise, the hopper portion includes a pair of generally opposed side walls and a pair of generally opposed end walls transverse said side walls to define the hopper cavity having first and second end perimeters. As with the preceding embodiments, the hopper cavity is dimensioned to be disposed within the trough cavity of each trough portion and to cooperate therewith to support at least a portion of said hopper cavity within the trough cavity.

In one aspect of this feeder system the number of voids in at least one side wall of the second trough portion is greater than the number of voids in at least one side wall of the first trough portion. In one embodiment at least one of the side walls of the first trough portion includes at least one void or feed hole therethrough, and at least one side wall of the second trough portion includes at least two voids or apertures therethrough, wherein the number of said voids in the side wall of the second trough portion is greater than the number of voids in the side wall of the first trough portion. In another embodiment, each of the side walls of the first trough portion includes at least one void therethrough, and each of said side walls of the second trough portion includes at least two voids therethrough. The number of voids in at least one side wall of the second trough portion being greater than the number of voids in at least one side wall of the first trough portion.

In another aspect of the invention, the trough and/or hopper wall structure includes structure adapted to cooperate with at least a portion of a fence post to secure the feeder to one or more such posts. In a preferred embodiment, the trough portions and a corresponding part of the hopper upper ends include a recess or similar structure adapted to receive a portion of a fence post in a securing relationship. Still more preferably, each of the first and second trough portions includes a recess disposed in each end wall, the recess adapted to receive at least a portion of a fence post member.

In another aspect of the invention the side walls of the trough portions are at least about ⅜ inches thick adjacent the voids. In this way, the animals have difficulty biting the trough portions around the feed holes or apertures with their molars. In another aspect of the invention, adjacent voids, e.g., feed holes, are spaced apart a distance of at least about three inches to reduce contact between feeding animals.

In still another aspect of the invention, the hopper portion includes a compound taper in its wall structure, the taper of the wall structure becoming increasingly more abrupt or steep from the first end to the second end. In a preferred embodiment a first portion of at least one hopper side wall extends toward the other hopper side wall at a first angle, and a second portion of said side wall extends toward the other hopper side wall at a second angle, the first angle being greater than the second angle to define the compound taper extending from the side wall first end to the side wall second end. In another preferred embodiment, a first portion of each said hopper side wall extends toward the other at a first angle, and a second portion of each said hopper side wall extends toward the other at a second angle to define a compound taper in each hopper side wall.

Many additional features, advantages and a fuller understanding of the invention will be had from the following detailed description of the preferred embodiments and accompanying drawings.

DETAILED DESCRIPTION OF THE PREFERRED EMBODIMENTS

Figure 1:
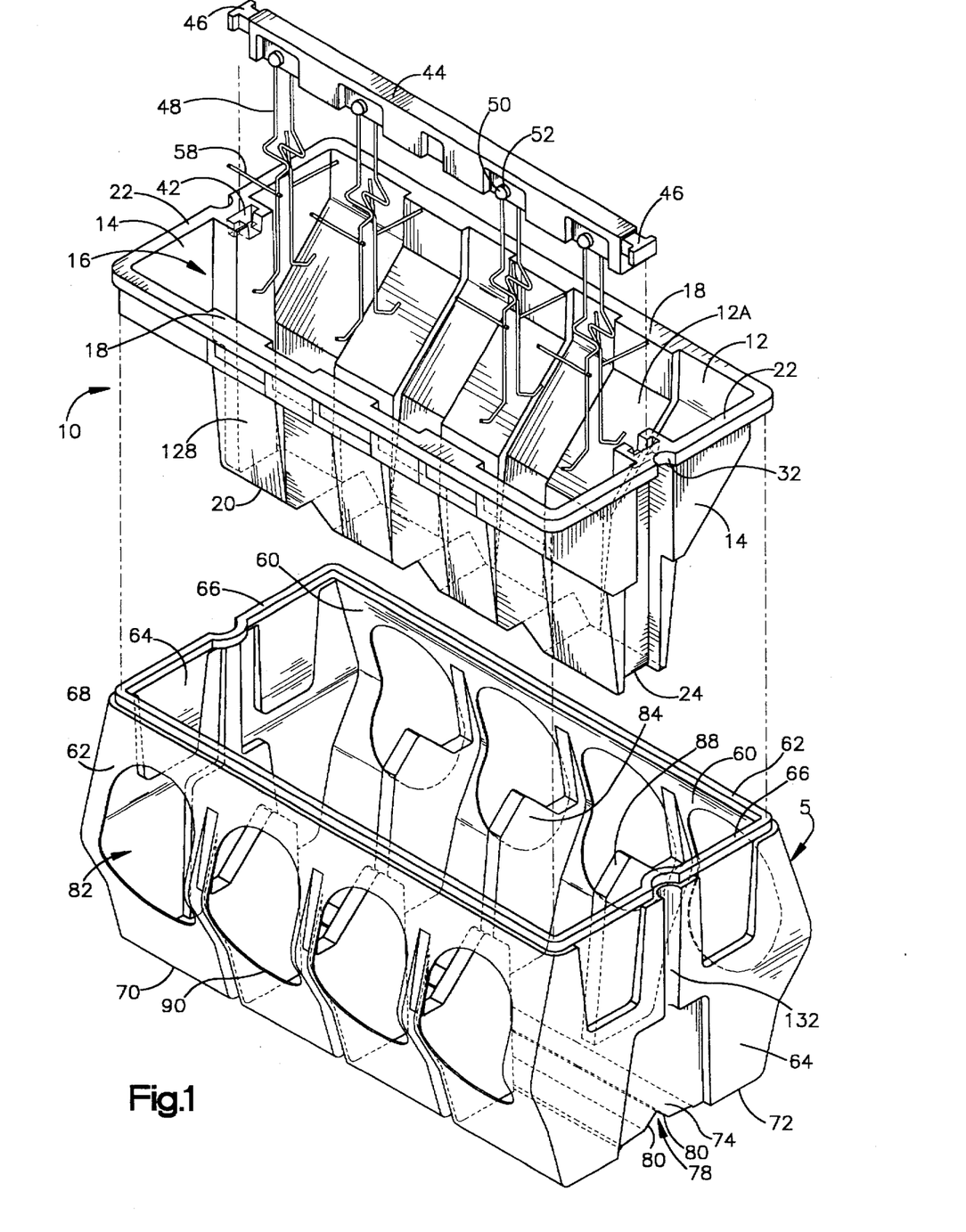
FIG. 1 is an exploded perspective view of a five hole feeder according to the invention.
Figure 1A:
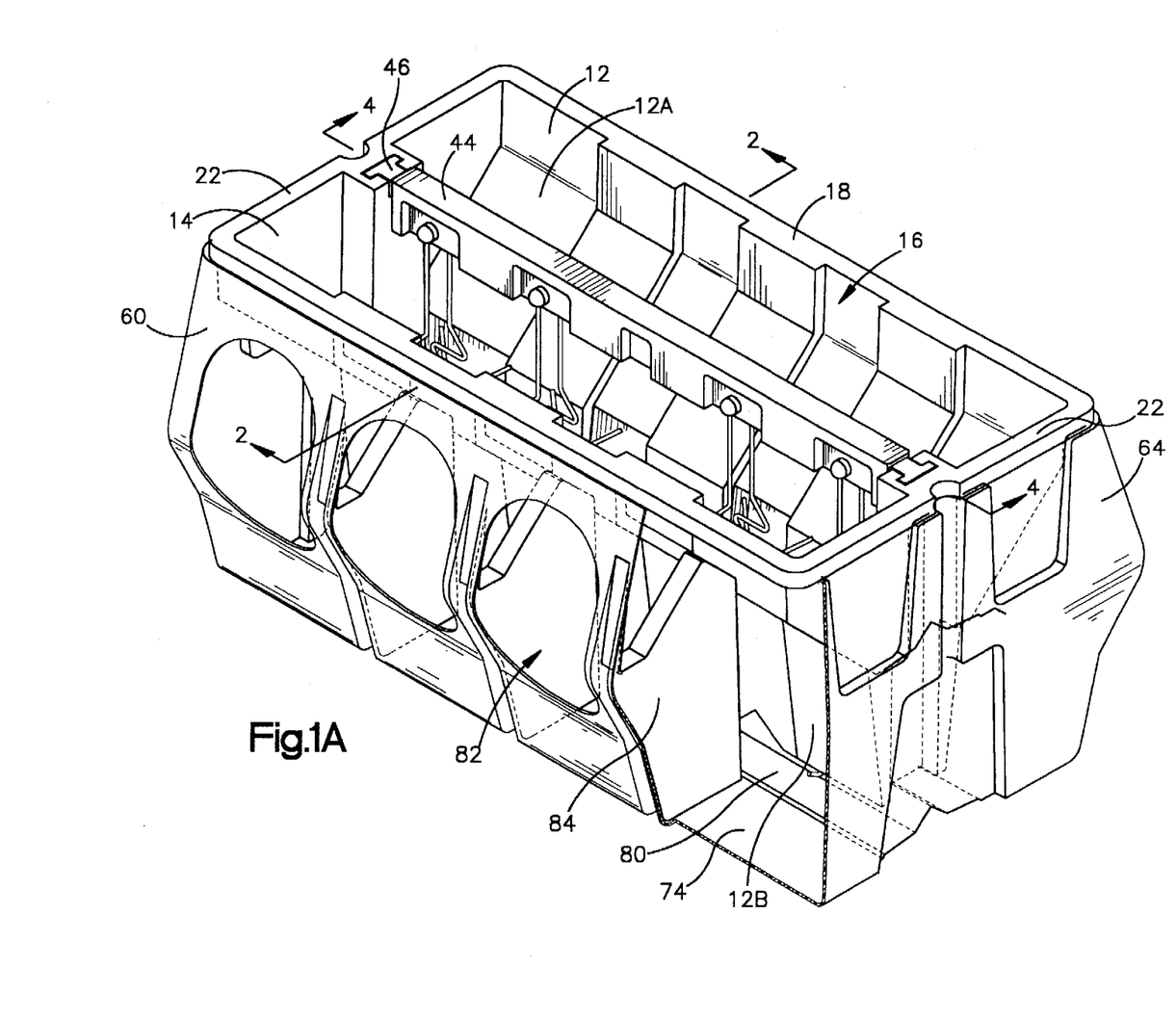
FIG. 1A is a perspective view of a four hole feeder according to the invention nested with the hopper shown in FIG. 1.
Figure 2:
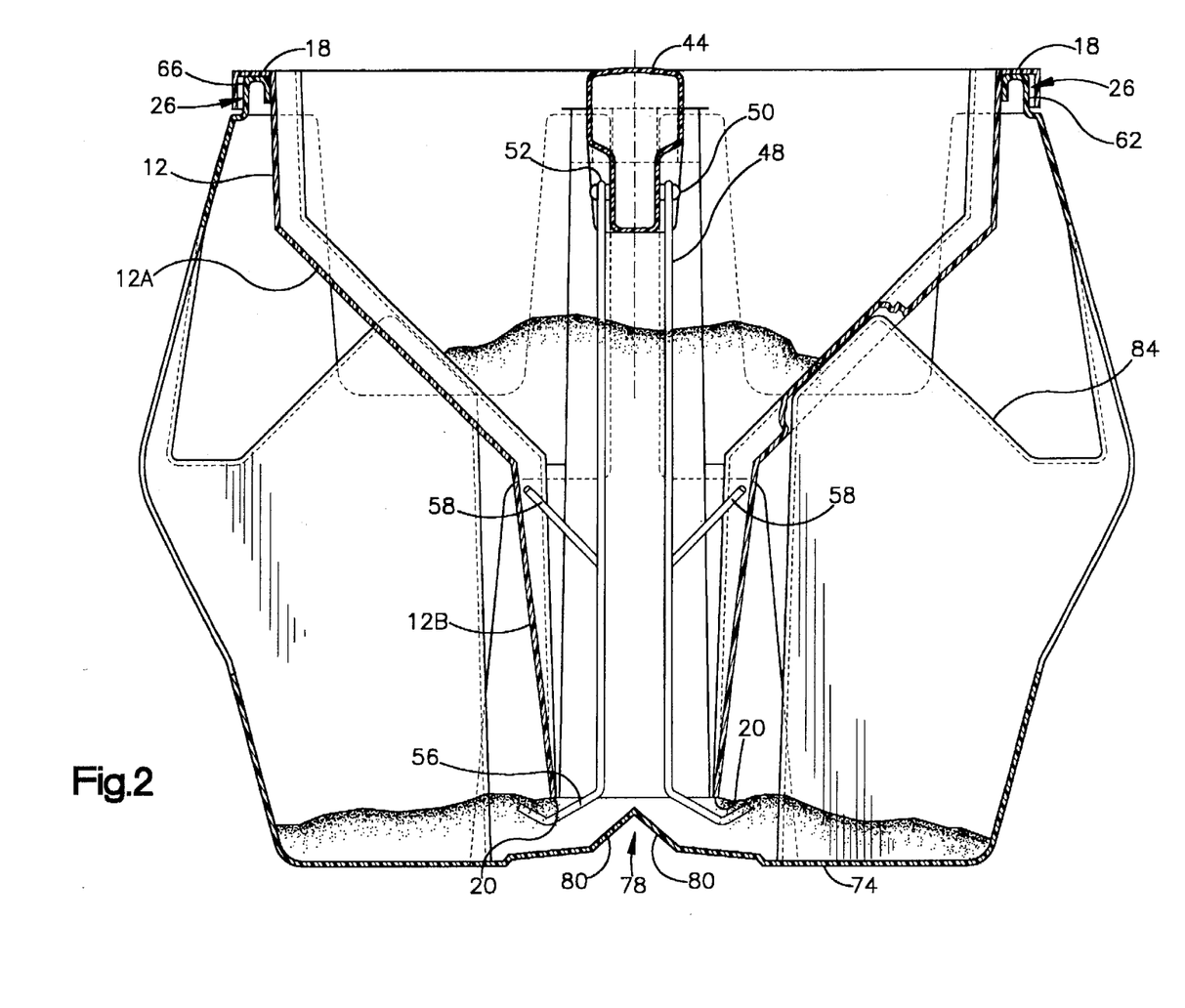
FIG. 2 is a section view of the feeder of FIG. 1A along line 2—2.

Referring to FIGS. 1, 1A and 2, a feeder is shown comprising a trough portion 5 and a hopper portion 10. Advantageously, the hopper portion 10 can be readily removed from the trough portion 5 by lifting it out of its nesting relationship (best seen in FIGS. 1A and 2) with trough portion 5. As a result, every portion of the trough and hopper can be easily accessed for thorough cleaning.

The hopper portion 10 has a pair of opposed side walls 12 and a pair of opposed end walls 14 transverse the side walls 12. The side walls and end walls intersect to form a hopper cavity 16. The side walls 12 have first, upper, ends 18 and second, bottom ends 20. Likewise, the end walls 14 have first, upper, ends 22 and second, bottom, ends 24. The intersection of said side wall first ends 18 with said end wall first ends 22 define a first end perimeter of the hopper cavity 16, and the intersection of said side wall second ends 20 with said end wall second ends 24 defines a second end perimeter of said hopper cavity. The first end perimeter is greater than the second end perimeter so that the hopper 10, when viewed on end, becomes narrower from top to bottom.

The narrow second, or bottom, end perimeter regulates the flow of feed from the hopper portion 10 into the trough portion 5. It also provides room in the trough portion 5 for feed to flow out into the bottom of the trough portion 5, and for animals to move their heads within the trough portion 5 and eat the feed. Also to facilitate and regulate the flow of feed from the hopper portion 10, the side walls 12, in the preferred embodiment shown, have a compound taper. In this embodiment, a first portion 12A of a side wall 12 extends toward an opposed side wall 12 at a first angle, and a second portion 12B of a side wall 12 extends toward an opposed side wall 12 at a second angle to form a side wall having a compound taper as it extends from said first end to said second end. As seen in the drawings, the angle of the first portion 12A with respect to a central longitudinal plane normal to the end walls 14, is substantially greater than the angle of the second portion 12B with respect to said central longitudinal plane. This enables the hopper 10 to hold a sufficiently large amount of feed, while at the same time facilitates flow of feed from the hopper. Preferably, the angle of the second side wall portion 12B is small with respect to said central longitudinal plane. Most preferably, the side wall portion 12A makes an angle of from about 35 to 50 degrees with respect to said central longitudinal plane, and the side wall portion 12B makes an angle with respect to said central longitudinal plane of from about 5 to about 10 degrees. It is believe that this improves flow and helps reduce clogging. It will be apparent to those of ordinary skill in the art in view of the instant disclosure that, while in the preferred embodiment, the side walls 12 include a compound taper, a single taper or other angled configurations could be adapted to the present hopper design.

As seen best in FIG. 2, in the preferred embodiment, the first ends 18 of the side walls 12, and first ends 22 of the end walls 14 include an inverted generally U shaped lip portion 26 about the first end perimeter of the hopper 10. The lip portion 26 cooperates with the first ends 62, 66 of the trough side walls 60 and trough end walls 64, respectively, to facilitate a secure nesting relationship between the trough 5 and hopper 10. In particular, the upper ends 62, 66 of the side walls and end walls 60, 64 are dimensioned to be received within the lip portion 26 and limit relative movement between the hopper and trough. The first, or upper, ends 22 of the end walls 14 also include a recess 32. The recess is oriented generally transverse the plane of the end walls 14, and dimensioned to receive a portion of a fence post. As shown, the recess is semi-circular. However, it will be apparent to those of ordinary skill in the art that the recess can be dimensioned to correspond to any standard fence shape.

Figure 4:
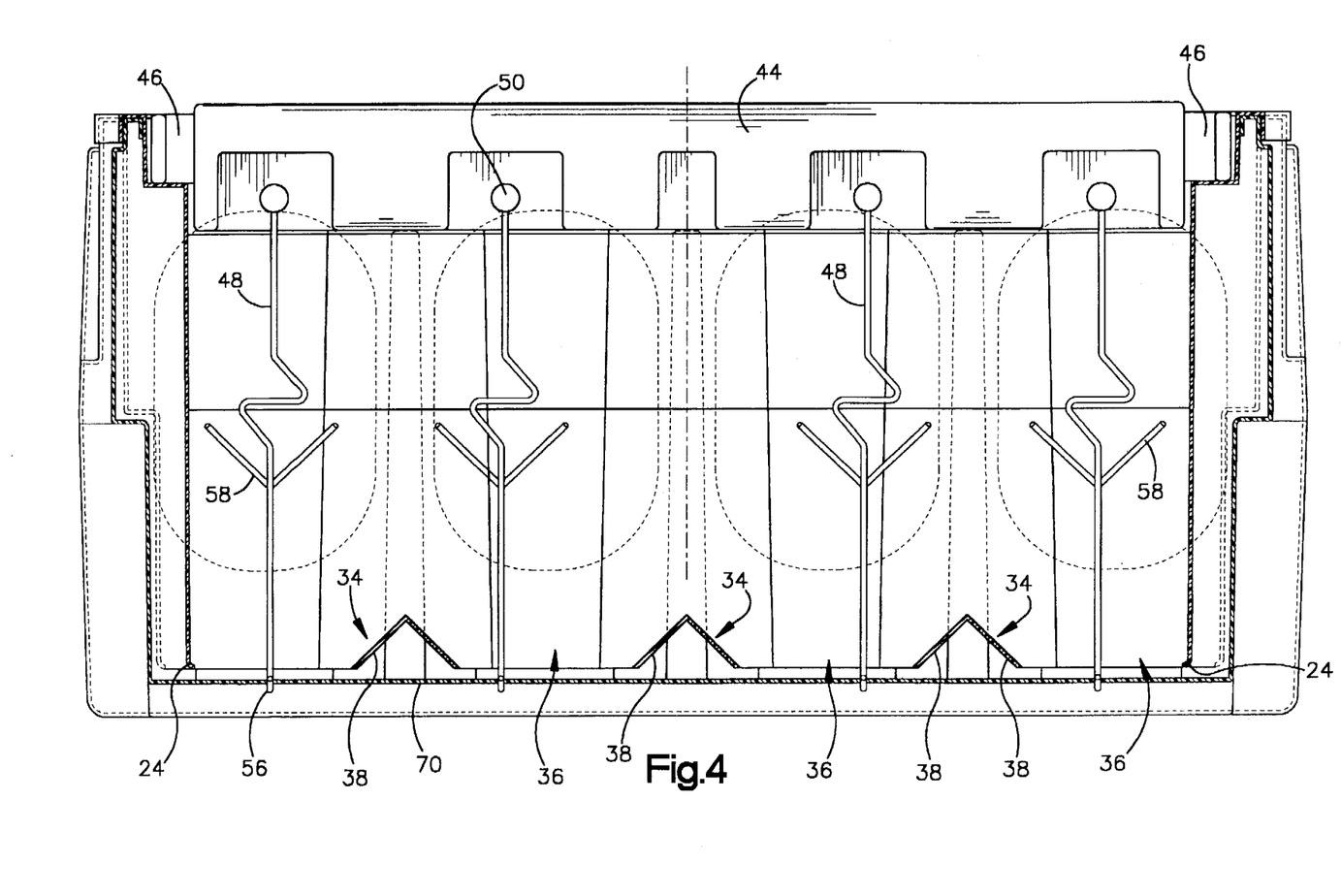
FIG. 4 is a section view of the feeder of FIG. 1 along line 4—4.

The second end perimeter of the hopper 10 defines a passage or passages in the bottom of the hopper portion 10 through which feed that is contained in the hopper can pass into the trough portion 5. The passage can be a single void extending the entire length of the hopper portion 10 bounded by the second ends 20, 24 of the side walls 12 and end walls 14 or, in the preferred embodiment best seen in FIG. 4, the second end perimeter of the hopper 10 defines a series of voids 36, each void being separated from an adjacent void by a reinforcing member 34. Reinforcing members 34 extend transversely from one side wall 12 to an opposed side wall 12, and function, as their name would imply, to reinforce the structure of the hopper 10. As shown, the reinforcing members 34 comprise a pair of generally planar surfaces 38 oriented obliquely with respect to the second ends 20 of the side walls 12, and which intersect to form a peak. The peaked shape of reinforcing members 34 facilitates the dispersement of feed from the hopper 10 into the trough 5.

The first, or upper, ends 22 of the end walls 14 also include recesses 42 adapted to receive and support agitator support bar 44. In the preferred embodiment shown, the agitator support 44 is an elongate member that extends transversely from at least a portion of one end wall 14 to at least a portion of an opposed end wall 14. As seen, the securement of the agitator support 44 with the hopper 10 may be accomplished by inserting T-shaped members 46, disposed on opposite ends of the agitator support 44, within corresponding T-shaped recesses 42 formed in the first ends 22 of the end walls 14. It will be apparent to those of ordinary skill in the art that the agitator support 44 may be secured to, or disposed on, the hopper 10 in other ways. For example, instead of T-shaped members 46, the agitator support 44 can include hook members adapted to rest on first ends 22 or 18. Irrespective of how agitator support is mounted onto the feeder, it will be mounted so as to suspend one or more agitator bars 48. The agitator bars 48 extend from the agitator support 44 into the hopper cavity 16 and function to agitate the feed in the hopper while the animals feed so as to prevent clumping of feed and ensure good feed flow from the hopper 10 to the trough 5.

The agitator bars 48 are attached to, and suspended from, hangar members 50. Hangar members 50 are oriented transversely to the longitudinal axis of the support 44, extending toward opposing side walls 12 to provide structure from which to hang agitator bars 48. The hangar members 50 may be, for example, hook shaped, bolt shaped or the like so that when an eye portion 52 of an agitator bar 48 is disposed thereon, it is secured to the support 44, but hangs freely from the hangar member 50. This allows the agitator bar to swing freely while hanging from the support 44. The agitator bars 48 are formed from a long, generally narrow metal rod. At a first end the bars 48 include an eye portion 52 adapted to fit onto a portion of hangar members 50. At a second end, opposite the first end, the agitator bars 48 include a first agitator portion 56. In the preferred embodiment shown, the first agitator portion is generally L-shaped or hook shaped. In between the first and second ends, the agitator bars preferably include a plurality of agitator prongs 58 extending transversely outwardly from the bar 48. In operation, the second ends 56 and agitator prongs 58 extend into the feed contained in the hopper 10. Because of the loose manner in which the bars 48 are suspended from the support 44, they are easily displaced and moved by the actions of the feeding animals. In this way, the activity of the feeding animals tends to cause the agitator bars to move. As a result, the ends 56 and prongs 58 tend to break up any chunks or clumps in the feed and to cause the feed to flow properly from the hopper 10 to the trough 5. This is advantageous because it reduces or eliminates the need of the farmer to constantly monitor the status of the feed in each hopper and manually agitate it to maintain proper feed flow.

The trough portion 5 is formed from a pair of opposed side walls 60 having first, or upper, ends 62, and a pair of opposed end walls 64 having first, or upper, ends 66. The side walls 60 and end walls 64 intersect to form a trough cavity 68. As can be seen in FIG. 2, the upper ends 62, 66 of the trough side walls 60 and end walls 64 include a ridge portion configured to cooperate with the lip portion 26 of the upper ends 18, 22 of the hopper side walls 12 and end walls 14. In this way, the hopper 10 can be securely nested within trough portion 5. When nested, the ridge portions of the upper ends 62, 66 of the trough side walls and end walls are received into the inverted U-shaped lip portions 26 of the upper ends 18, 22, of the hopper side walls and end walls, thereby limiting relative movement between the hopper 10 and trough 5.

At their opposite ends, the side walls 60 have second, or bottom, ends 70, and the end walls 64 include second, or bottom ends 72. In the preferred embodiment, the second ends 70, 72 of the trough side walls and end walls 60, 64, intersect a trough bottom wall 74 oriented transversely to said trough side walls and end walls. In the two sided feeders shown, for example, in FIGS. 1 and 2, the bottom wall 74 includes a longitudinal ridge portion 78 disposed transversely to said end walls 64 midway between the intersection of said side walls 60 and said bottom wall 74. The ridge portion 78 preferably comprises opposed wall portions 80 of the bottom wall 74 oriented obliquely with respect to said bottom wall 74 and intersecting at approximately a trough central longitudinal plane bisecting the trough end walls 64. When the hopper 10 is nested within the trough cavity 68, the ridge portion 78 is disposed below the voids 36 bounded by the second end perimeter defined by the second ends 20, 24 of the hopper side walls and end walls 12, 14. As seen best in FIG. 2, feed passing from the hopper 10 through the voids 36 will hit the ridge portion 78. The sloping wall portions 80 of the ridge portion 78 will cause the feed to disperse to opposite sides of the ridge portion 78. As a result, feed passing from the hopper 10 into the trough 5 will be substantially evenly distributed along the trough bottom wall 74 on opposite sides of the ridge portion 78. To facilitate dispersement of feed in a one sided feeder such as that shown in FIG. 3, the bottom wall 74 of the trough 5 can likewise be sloped toward the side wall 60.

The end walls 64 of the trough 5 preferably include recesses 132 configured to cooperate with at least a portion of a fence post. As with recesses 32 of the first ends 22 of the hopper end walls 14, the recesses 132 are oriented generally transverse the plane of the end walls 64, and dimensioned to receive a portion of a fence post. As shown, the recess is semi-circular. However, it will be apparent to those of ordinary skill in the art that the recess can be dimensioned to correspond to any standard fence shape. The recesses 132 are located on the end walls 64 so that they align with recesses 32 when the hopper 10 is mounted on and nested with the trough 5. In this way, the recesses 32, 132 cooperate to receive a fence post and secure the feeder in position therebetween.

Figure 5A:
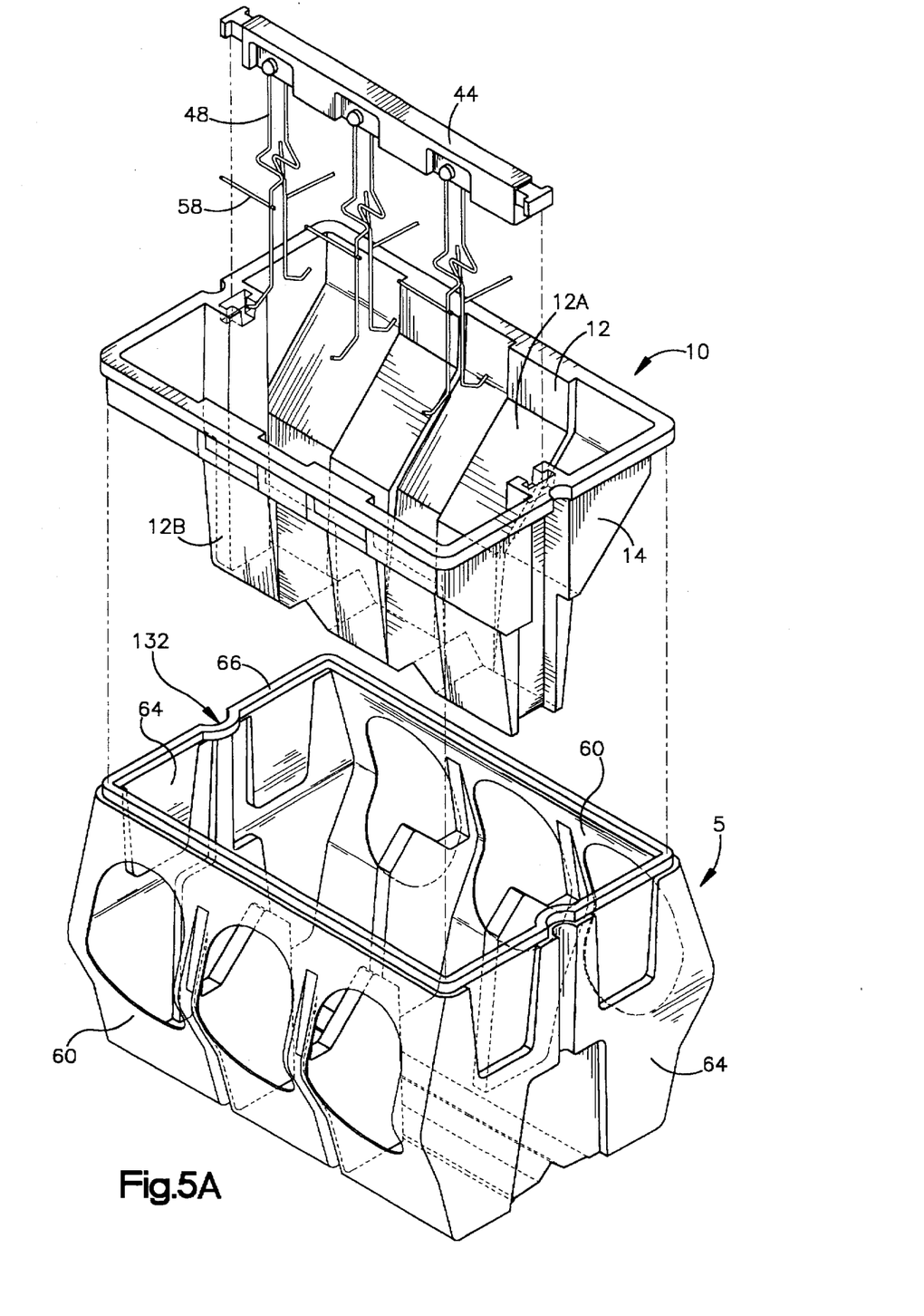
FIG. 5A is an exploded perspective view of a three hole feeder according to the invention.
Figure 5B:
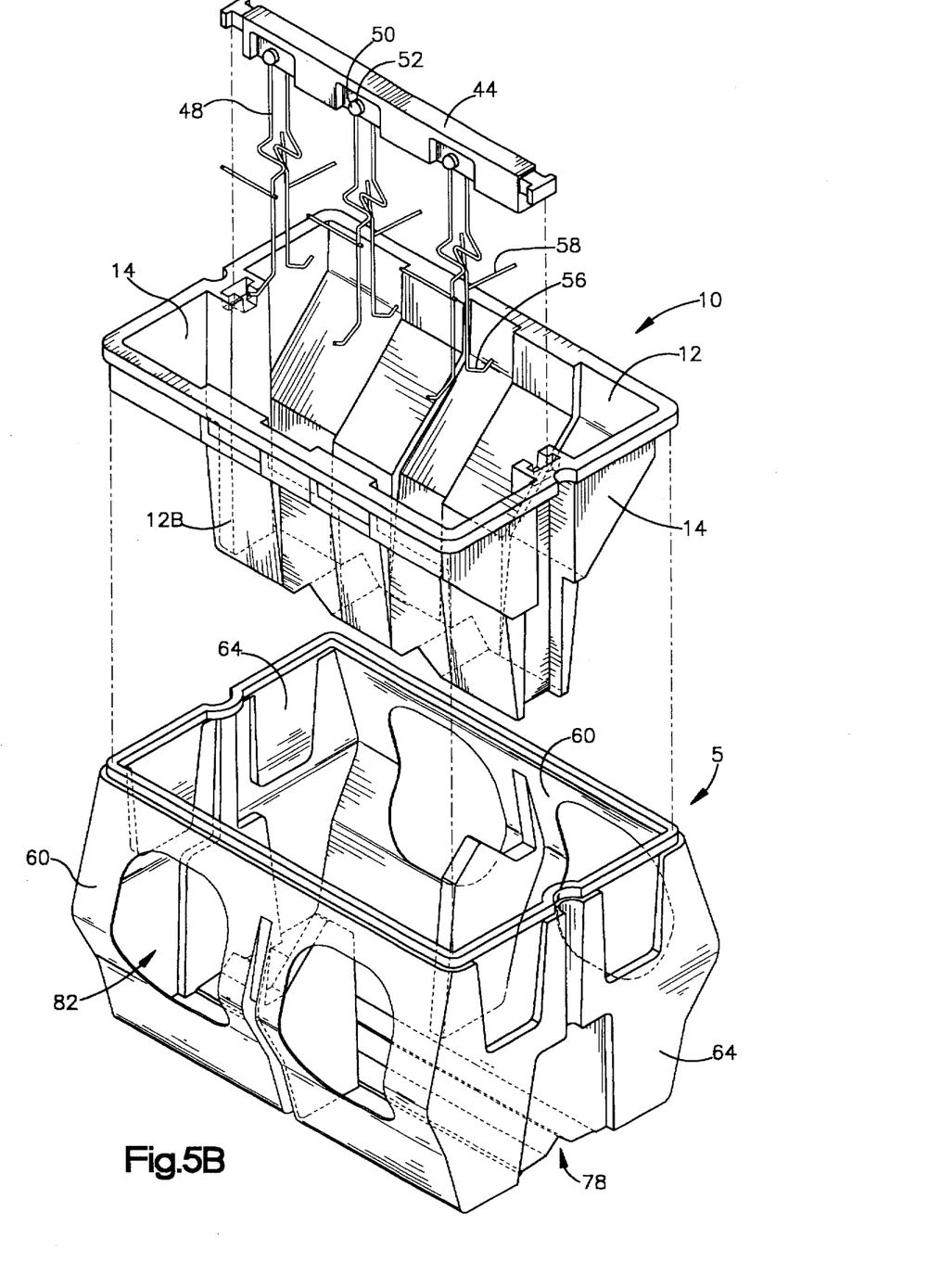
FIG. 5B is an exploded perspective view of a two hole feeder according to the invention employing the hopper of FIG. 5A.
Figure 6:
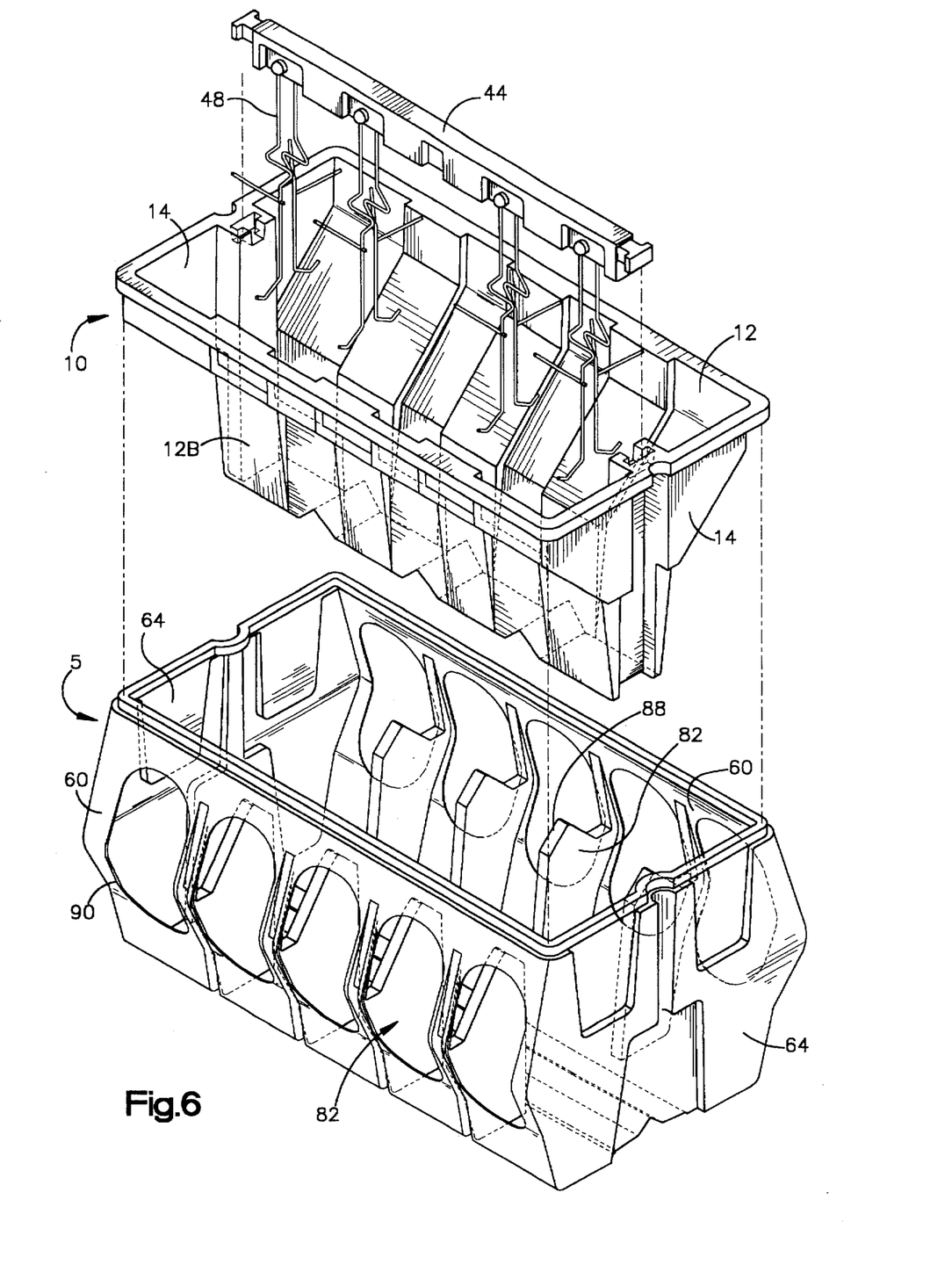
FIG. 6 is an exploded perspective view of a five hole feeder according to the invention employing the hopper of FIG. 1.

The side walls 60 of the trough 5 include feed holes 82 therethrough that enable the animals to access the feed passing from the hopper 10, to the trough bottom wall 74. The number of feed holes 82, and whether feed holes are disposed in one or both side walls 60, will depend upon the particular application to which the feeder is put. As seen in FIGS. 1 and 6, the hopper 10 can be used in cooperation with a trough 5 having five holes disposed in each side wall 60, or in cooperation with a trough 5 having four holes disposed in each side wall 60. As seen in FIGS. 5A and 5B, a single hopper 10 can be used in cooperation with a trough 5 having three holes in each side wall, or a trough having two holes in each side wall. As noted, the particular number of holes that are disposed in a given trough will depend upon the particular application. If feeding a large number of small pigs, the trough can include upwards of five or more feed holes in each side wall 60. As the animals grow, the number of feed holes in each side wall can be reduced, while increasing the size of the feed holes to accommodate the larger animals. Since only the number and size of the feed holes changes, but the overall trough dimensions remain the same, the same hopper 10 can be used on a plurality of different troughs.

It will be apparent to those of ordinary skill in the art that the particular number and combinations of feed holes associated with a given series of troughs suitable for a single hopper can vary significantly. For example, a single hopper may be suitable for use in cooperation with a trough having anywhere from three to six or more holes in each side wall. Moreover, the number of feed holes in each side wall of a two sided feeder need not be the same. Thus, for example, one side wall 60 might have three or four feed holes, while the opposite side wall 60 might have five or six feed holes. Likewise, a given hopper might cooperate with a trough in which one side wall has one or two feed holes, while the opposite side wall has three. This allows a farmer a great amount of flexibility in locating different populations of animals in adjacent pens, while accommodating the feeding needs of each. Subject to the desirability of the animals being able to access all portions of the trough, so that feed does not build up in unaccessible portions of the trough and create a health or sanitary threat, and subject to the object of not wanting to unnecessarily waste space, troughs having virtually any number combination of feed holes can be manufactured to cooperate with a single hopper. In view of the objects of health and efficient use of space, it may therefore be preferable to employ a first hopper size to cooperate with troughs having from one to three feed holes in one or both side walls, and a second hopper size to cooperate with troughs having from four to six feed holes in one or both side walls.

Figure 3:
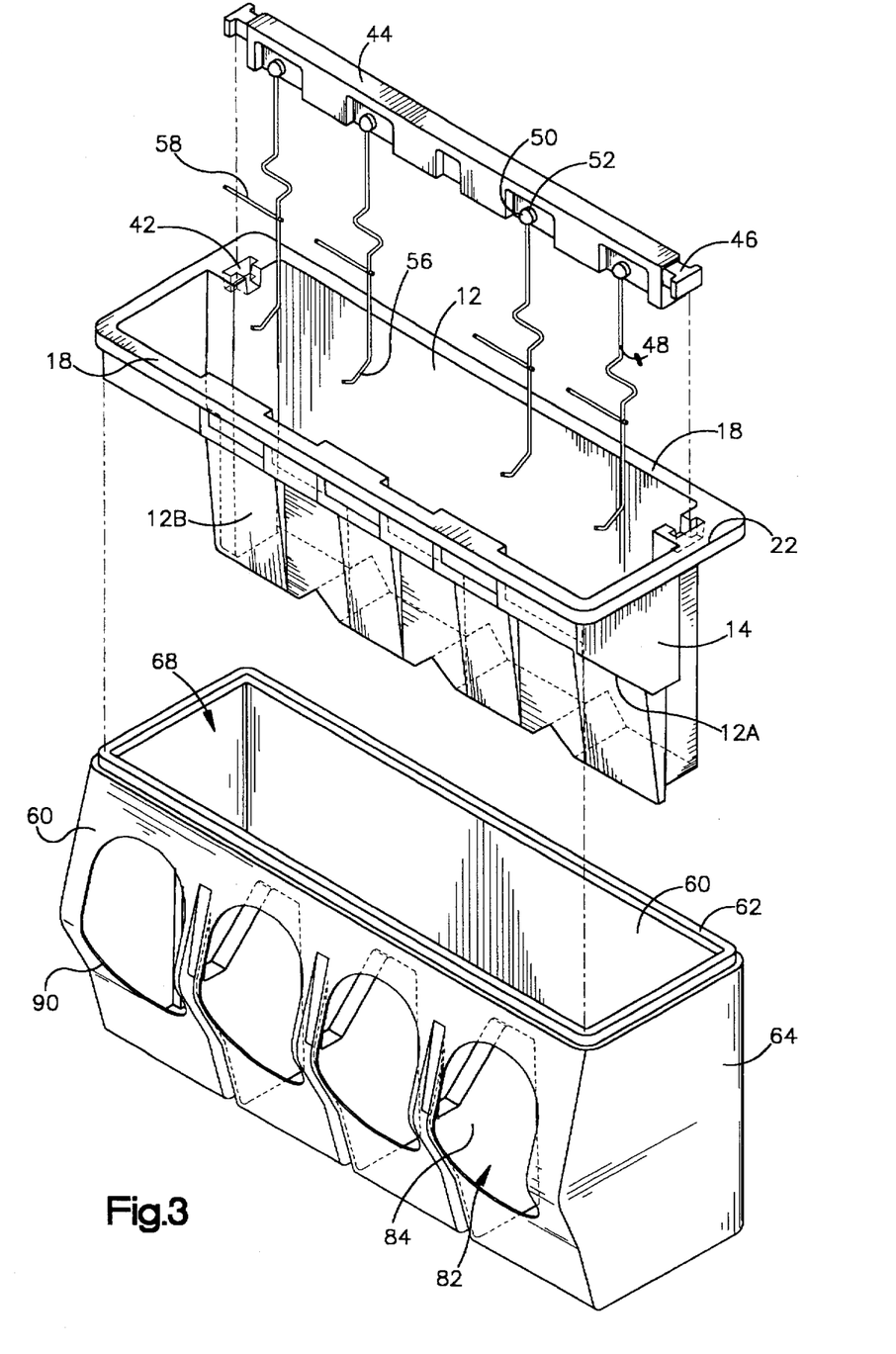
FIG. 3 is an exploded perspective view of a one sided feeder according to the invention.

In smaller facilities, where the number of animals and number of differing animal populations is more limited, it is not always necessary to employ two sided feeders. FIG. 3 shows a one sided feeder variation of the invention. As can be seen in the figure, the one sided feeder differs from the two sided embodiment essentially only in that it has feed holes in one side wall. As such, hopper 10 need only include the preferred compound taper in one side wall 12, and the agitator support 44 need not employ as many agitator bars 48. Like the two sided feeders of the invention, hopper 10 can cooperate with a plurality of troughs 5 having varying numbers of feed holes 82. As shown, hopper 10 is adapted to cooperate with a four hole trough. However, as will be apparent to those of ordinary skill in the art in view of this disclosure, the hopper 10 will also cooperate with, for example, a three hole trough or a five hole trough. Subject to the health and space concerns noted above, the number of troughs with which a given hopper 10 will cooperate can vary.

Referring again to FIGS. 1 and 2, the trough 5 preferably includes divider walls 84. The divider walls 84 extend into the trough cavity 68 generally transverse the side walls 60 and bottom wall 74 of the trough 5. The divider walls 84 are disposed along the side walls 60 between adjacent feed holes 82. In the preferred embodiment, best seen in FIG. 2, the divider walls 84 are configured to provide additional support for the hopper side walls 12. To this end, the divider walls 84 include an upper end portion 88. The upper end portions 88 extend at an angle with respect to the central longitudinal plane normal to the end walls 64. This angle corresponds to the angle that the first wall portions 12A of the hopper 10 make with respect to a central longitudinal plane of the hopper. The angled upper end portions 88 of the divider walls 84 are disposed on said divider walls 84 a distance above the bottom wall 74 corresponding substantially to the distance above the bottom wall 74 that the first side wall portions 12A of the hopper 10 are disposed when the hopper 10 is nested in the trough cavity 68. In this way, the upper end portions 88 of the divider walls 84 serve to support the side walls 12 of the hopper 10 when the hopper is nested in trough 5. The divider walls eliminate eye contact between adjacent animals while feeding, and thereby reduce instances of aggression.

To further reduce the amount of aggression between feeding animals, feed holes 82 are preferably spaced apart a distance effective to reduce or minimize physical contact between adjacent animals while feeding. In the preferred embodiment, the feed holes are spaced apart a distance of from about 3 to about 5 inches. Still more preferably, the feed holes are spaced apart a distance of about three inches.

Another advantageous dimension associated with the trough 5 is the wall thickness of the side walls 60 bordering the feed holes 82. Feeding animals may tend to bite the perimeter edges 90 of feed holes 82, resulting in damage to the feeder trough 5. By forming the trough 5 so that the side walls 60 have adequate thickness at the perimeter edges 90 of the feed holes 82, the amount of damage that can be imparted by biting animals can be reduced. More particularly, if the walls are thick enough at the edges of the feed holes, the ability of the animals to bite down on the edges with their molars is reduced. By eliminating or reducing the ability of the animals to bite the edges with their molars, the amount of damage that can be imparted to the side walls 60 around the perimeter edges 90 of the feed holes 82 can be significantly reduced, thereby prolonging the useful life of the trough 5.

The animal feeder of the invention is preferably molded from a plastic or polymer material. Suitable materials are, for example, high density polyethylene (HDPE), high density polypropylene (HDPP), polyvinyl chloride (PVC) and the like. Most preferably the feeder of the invention is rotationally molded from polymer concrete, i.e., polyester concrete. Rotational molding, or rotomolding, processes are known to those of ordinary skill in the manufacturing art and adaptation thereof for the manufacture of the present invention would be well within the skill in the art in view of the present disclosure. To this end, molds for the hopper 10, trough 5 and agitator support 44 are prepared as is known in the art. The desired amount of plastic, resin or polymer compounds is then placed in the mold and then heated in an oven. The molds are then centrifugally rotated to ensure uniform distribution of the material. After cooling, the finished parts are removed from the molds.

Advantageously, roto-molding eliminates welded seems associated with welded metal or sheet molded feeders. As a result, the inventive feeder eliminates many of the places associated with current feeder designs that would otherwise harbor bacteria and germs. Moreover, the desired wall thicknesses are easily obtained by adjusting the amount of material added to the molds.

Many modifications and variations of the invention will be apparent to those skilled in the art in light of the forgoing detailed disclosure. For example, the hopper and trough need not be rectangular as shown, but could instead be multi-sided, e.g., hexagonal or octagonal, or could be circular for disposition within the center of a pen. Similarly, feed holes 82 are shown in the preferred form as generally annular apertures in the side walls. However, other suitable void configurations in the wall structure by which animals may access the feed in the trough may be devised. For example, the trough structure could employ a single large void in the wall structure proper, with each void being separated by divider walls formed in the trough. Therefore, within the scope of the appended claims, the invention can be practiced otherwise than as specifically shown and described.

What is claimed is:

1. An animal feeder comprising a hopper portion including hopper wall structure having first and second ends and defining a hopper cavity having a first end perimeter and a second end perimeter that is smaller than said first end perimeter, a trough portion including trough wall structure defining a trough cavity, said hopper portion releasably cooperating with said trough portion to suspend said second end perimeter within said trough cavity, said trough wall structure including at least one void therein, whereby feed disposed within said hopper cavity flows into said trough cavity and is accessible through said at least one void, said first end perimeter of said hopper portion including at least one support member facilitating dispersement of feed into said trough cavity.

2. The feeder of claim 1 wherein said trough wall structure includes a first end adapted to cooperate with said hopper wall structure, said trough first end releasably engaging at least a portion of said hopper wall structure to suspend said second end perimeter within said trough cavity.

3. The feeder of claim 1 wherein said trough wall structure includes a first end defining a trough first end perimeter, said trough first end perimeter being complementary to said hopper first end perimeter and cooperating with said hopper first end perimeter to support said hopper second end perimeter within said trough cavity.

4. The feeder of claim 1 or 2 wherein said trough wall structure includes hopper support members disposed within said trough cavity and adapted to cooperate with said hopper wall structure, said hopper support members releasably engaging at least a portion of said hopper wall structure to suspend said second end perimeter within said trough cavity.

5. The feeder of claim 1 comprising a plurality of voids disposed in said trough wall structure and wherein said trough wall structure includes divider members disposed between adjacent voids, said divider members being generally planar and extending into said trough cavity generally transversely of said trough wall structure, said divider members being adapted to eliminate eye-to-eye contact between adjacent feeding animals.

6. The feeder of claim 5 wherein said divider members are adapted to cooperate with said hopper wall structure, said divider members releasably engaging at least a portion of said hopper wall structure to suspend said second end perimeter within said trough cavity.

7. The feeder of claim 1 wherein said hopper wall structure comprises a pair of opposed side walls and a pair of opposed end walls transverse said side walls, said hopper side walls and end walls intersecting to define said hopper cavity, said trough wall structure comprises a pair of opposed side walls and a pair of opposed end walls transverse and intersecting said side walls to define said trough cavity, and said at least one void comprises a generally annular aperture disposed in at least one of said trough side walls.

8. The feeder of claim 1 wherein said trough wall structure includes a pair of opposed side walls and a pair of opposed end walls transverse and intersecting said side walls to define said trough cavity, said side walls and said end walls each having ends intersecting a trough bottom wall oriented transverse said side walls and end walls, said bottom wall including a longitudinal ridge portion disposed transverse said end walls substantially midway between the intersection of said side walls and said bottom wall.

9. The feeder of claim 8 wherein said ridge portion comprises opposed wall portions formed integral and of one piece with said bottom wall and oriented obliquely with respect to said bottom wall and intersecting at approximately a trough central longitudinal plane bisecting the trough end walls.

10. An animal feeder system comprising:
a) first and second trough portions including trough wall structure defining a trough cavity, said wall structure of each of said first and second trough portions including at least one void disposed therein;
b) a hopper portion including hopper wall structure having first and second ends and defining a hopper cavity having a first end perimeter and a second end perimeter that is smaller than said first end perimeter, said hopper portion adapted to cooperate with each said first and second trough portions to suspend said second end perimeter within said trough cavities, whereby feed disposed within said hopper cavity flows into one of said trough cavities and is accessible from said voids.

11. The feeder system of claim 10 wherein the number of voids disposed in said wall structure of said second trough portion is greater than the number of voids disposed in said wall structure of said first trough portion.

12. The feeder system of claim 10 wherein said voids are generally annular apertures through said trough wall structure, said wall structure of said first trough portion includes at least one said aperture therethrough, and wherein said wall structure of said second trough portion includes at least two said apertures therethrough, and wherein the number of said apertures in said wall structure of said second trough portion is greater than the number of apertures in said wall structure of said first trough portion.

13. The feeder system of claim 12 wherein each of said first and second trough portions includes generally planar divider walls disposed along said wall structure between adjacent apertures and extending generally transversely said trough wall structure into said trough cavity.

14. An animal feeder system comprising:
a) first and second trough portions including a pair of generally opposed side walls and a pair of generally opposed end walls transverse said side walls, said trough side walls and end walls intersecting to define a trough cavity, at least one side wall of each of said first and second trough portions including at least one void disposed therein;
b) a hopper portion including a pair of generally opposed side walls and a pair of generally opposed end walls transverse said side walls, said hopper side walls and end walls having first and second ends, and intersecting to define a hopper cavity having first and second end perimeters, said first end perimeter being greater than said second end perimeter, said hopper cavity being dimensioned to be disposed within said trough cavity of said first and second trough portions, and said first and second trough portions being adapted to cooperate with said hopper portion to support at least a portion of said hopper cavity within said trough cavity, whereby feed disposed within said hopper cavity flows into one of said trough cavities and is accessible from said void.

15. The feeder system of claim 14 wherein the number of voids in at least one side wall of said second trough portion is greater than the number of voids in at least one side wall of said first trough portion.

16. The feeder system of claim 14 wherein at least one of said side walls of said first trough portion includes at least one void therethrough, and wherein at least one of said side walls of said second trough portion includes at least two voids therethrough, and wherein the number of said voids in said side wall of said second trough portion is greater than the number of voids in said side wall of said first trough portion.

17. The feeder system of claim 14 wherein each of said side walls of said first trough portion includes at least one void therethrough, and wherein each of said side walls of said second trough portion includes at least two voids therethrough, the number of said voids in at least one of said side walls of said second trough portion being greater than the number of voids in at least one of said side walls of said first trough portion.

18. The feeder of claim 14 wherein each of said first and second trough portions includes a recess disposed in each of said end walls, said recess adapted to receive at least a portion of a fence post member.

19. The feeder system of claim 14 wherein said side walls of said first and second trough portions are at least about ⅜ inches thick adjacent said voids.

20. The feeder system of claim 14 wherein adjacent feed holes are spaced apart a distance of at least about three inches.

21. The feeder system of claim 14 wherein a first portion of at least one of said hopper side walls extends toward the other of said hopper side walls at a first angle, and a second portion of said at least one side wall extends toward the other of said hopper side walls at a second angle, said first angle being greater than said second angle to define a compound taper extending from said side wall first end to said side wall second end.

22. The feeder system of claim 14 wherein a first portion of each said hopper side wall extends toward the other of said hopper side walls at a first angle, and a second portion of each said hopper side wall extends toward the other of said hopper side walls at a second angle, said first angle being greater than said second angle to define a compound taper from each said side wall first end to each said side wall second end.

* * * * *